US008613795B2

(12) United States Patent
Li et al.

(10) Patent No.: US 8,613,795 B2
(45) Date of Patent: Dec. 24, 2013

(54) ELECTRET WEBS WITH CHARGE-ENHANCING ADDITIVES

(75) Inventors: Fuming B. Li, Woodbury, MN (US); Feng Bai, Woodbury, MN (US); John M. Sebastian, Oakdale, MN (US); Marvin E. Jones, Grant, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 509 days.

(21) Appl. No.: 12/995,709

(22) PCT Filed: May 4, 2009

(86) PCT No.: PCT/US2009/042652
§ 371 (c)(1),
(2), (4) Date: Feb. 22, 2011

(87) PCT Pub. No.: WO2009/148744
PCT Pub. Date: Dec. 10, 2009

(65) Prior Publication Data
US 2011/0154987 A1    Jun. 30, 2011

Related U.S. Application Data

(60) Provisional application No. 61/058,041, filed on Jun. 2, 2008.

(51) Int. Cl.
*B03C 3/28* (2006.01)
*B29C 59/14* (2006.01)

(52) U.S. Cl.
USPC .......... 96/15; 55/528; 55/DIG. 5; 55/DIG. 39; 95/59; 96/66; 264/423; 264/455; 264/466; 264/469; 264/DIG. 48; 442/111; 442/115; 442/351; 442/400

(58) Field of Classification Search
USPC ........ 96/15, 17, 66–69; 55/385.3, 385.6, 528, 55/DIG. 3, DIG. 5, DIG. 35, DIG. 39; 95/57, 95/59; 264/423, 455, 466, 469, 483, 484, 264/DIG. 48; 442/110, 111, 115, 351, 400, 442/408, 414
See application file for complete search history.

(56) References Cited

U.S. PATENT DOCUMENTS

| | | |
|---|---|---|
| 2,204,705 A | 6/1940 | Scofield |
| 3,070,573 A | 12/1962 | Beck |
| 3,309,222 A | 3/1967 | Caldwell |
| 3,487,610 A * | 1/1970 | Brown et al. .................. 96/69 |
| 3,971,373 A | 7/1976 | Braun |
| 3,988,157 A | 10/1976 | Van Paesschen |
| 3,998,916 A | 12/1976 | van Turnhout |
| 4,016,375 A | 4/1977 | Van Turnhout |
| 4,029,582 A | 6/1977 | Ishii |
| 4,049,870 A | 9/1977 | Brodmann |
| 4,100,324 A | 7/1978 | Anderson |
| 4,118,531 A | 10/1978 | Hauser |
| 4,178,157 A | 12/1979 | van Turnhout |
| 4,215,682 A | 8/1980 | Kubik |
| 4,238,193 A | 12/1980 | Kisaichi |
| 4,264,750 A | 4/1981 | Anand |
| RE30,782 E | 10/1981 | van Turnhout |
| 4,375,718 A | 3/1983 | Wadsworth |
| RE31,285 E | 6/1983 | van Turnhout |
| 4,429,001 A | 1/1984 | Kolpin |
| 4,508,781 A | 4/1985 | Yagi |
| 4,523,995 A | 6/1985 | Pall |
| 4,536,440 A | 8/1985 | Berg |
| 4,547,420 A | 10/1985 | Krueger |
| 4,557,945 A | 12/1985 | Yagi |
| 4,588,537 A | 5/1986 | Klaase |
| RE32,171 E | 6/1986 | van Turnhout |
| 4,592,815 A | 6/1986 | Nakao |
| 4,617,124 A | 10/1986 | Pall |
| 4,617,390 A | 10/1986 | Hoppe |
| 4,652,282 A | 3/1987 | Ohmori |
| 4,729,371 A | 3/1988 | Krueger |
| 4,789,504 A | 12/1988 | Ohmori |
| 4,795,668 A | 1/1989 | Krueger |
| 4,798,850 A | 1/1989 | Brown |
| 4,807,619 A | 2/1989 | Dyrud |
| 4,827,924 A | 5/1989 | Japuntich |
| 4,850,347 A | 7/1989 | Skov |
| 4,874,399 A * | 10/1989 | Reed et al. .................. 95/57 |
| 4,883,547 A | 11/1989 | Japuntich |
| 5,025,052 A | 6/1991 | Crater |
| 5,057,710 A | 10/1991 | Nishiura |
| 5,062,421 A | 11/1991 | Burns |
| 5,099,026 A | 3/1992 | Crater |
| 5,237,986 A | 8/1993 | Seppala |
| 5,280,406 A | 1/1994 | Coufal |
| 5,307,796 A | 5/1994 | Kronzer |
| 5,325,892 A | 7/1994 | Japuntich |
| 5,346,691 A | 9/1994 | Raspanti |
| 5,374,458 A | 12/1994 | Burgio |
| 5,401,446 A | 3/1995 | Tsai |
| 5,411,576 A | 5/1995 | Jones |
| RE35,062 E | 10/1995 | Brostrom |
| 5,464,010 A | 11/1995 | Byram |
| 5,472,481 A | 12/1995 | Jones |
| 5,496,507 A | 3/1996 | Angadjivand |
| 5,502,118 A | 3/1996 | Macholdt |
| 5,509,436 A | 4/1996 | Japuntich |

(Continued)

FOREIGN PATENT DOCUMENTS

EP    620044 A2 * 10/1994   ............... 55/DIG. 39
EP    623941       11/1994

(Continued)

OTHER PUBLICATIONS

Buu-Hoi, The Scope of the Knoevenagel Synthesis of Aromatic Secondary Amines, Journal of the Chemical Society, pp. 4346-4349, (1952).

(Continued)

*Primary Examiner* — Richard L Chiesa
(74) *Attorney, Agent, or Firm* — Jeffrey M. Olofson

(57) ABSTRACT

Electret webs are presented which include a blend of a thermoplastic resin and a charge-enhancing additive. The charge-enhancing additives include N-substituted amino carbocyclic aromatic materials. The webs prepared from the blends may be in the form of films or non-woven fibrous webs. Non-woven microfiber webs are useful as filtration media.

20 Claims, No Drawings

(56) References Cited

U.S. PATENT DOCUMENTS

| | | |
|---|---|---|
| 5,543,054 A | 8/1996 | Charkoudian |
| 5,558,089 A | 9/1996 | Castiglione |
| 5,645,627 A * | 7/1997 | Lifshutz et al. .................. 96/15 |
| 5,656,368 A | 8/1997 | Braun |
| 5,696,199 A | 12/1997 | Senkus |
| 5,763,078 A | 6/1998 | Braun |
| 5,780,153 A | 7/1998 | Chou |
| 5,804,295 A | 9/1998 | Braun |
| 5,908,598 A | 6/1999 | Rousseau |
| 5,919,847 A | 7/1999 | Rousseau |
| D412,573 S | 8/1999 | Castiglione |
| 5,968,635 A | 10/1999 | Rousseau |
| 5,976,208 A | 11/1999 | Rousseau |
| 6,041,782 A | 3/2000 | Angadjivand |
| 6,068,799 A | 5/2000 | Rousseau |
| 6,072,027 A | 6/2000 | Scortichini |
| 6,074,869 A | 6/2000 | Pall |
| 6,095,143 A | 8/2000 | Dyrud |
| 6,110,251 A * | 8/2000 | Jackson et al. .................. 55/527 |
| 6,119,691 A | 9/2000 | Angadjivand |
| 6,123,752 A * | 9/2000 | Wu et al. ........................... 96/69 |
| 6,156,086 A | 12/2000 | Zhang |
| 6,174,964 B1 | 1/2001 | Jariwala |
| 6,187,391 B1 | 2/2001 | Kataoka |
| 6,213,122 B1 | 4/2001 | Rousseau |
| 6,214,094 B1 | 4/2001 | Rousseau |
| 6,216,693 B1 | 4/2001 | Rekow |
| 6,238,466 B1 | 5/2001 | Rousseau |
| 6,261,342 B1 * | 7/2001 | Rousseau et al. .................. 95/59 |
| 6,268,495 B1 | 7/2001 | Rousseau |
| 6,280,824 B1 | 8/2001 | Insley |
| 6,302,103 B1 | 10/2001 | Resnick |
| 6,332,465 B1 | 12/2001 | Xue |
| 6,371,116 B1 | 4/2002 | Resnick |
| 6,375,886 B1 | 4/2002 | Angadjivand |
| 6,391,948 B1 | 5/2002 | Clark |
| 6,394,090 B1 | 5/2002 | Chen |
| 6,397,458 B1 | 6/2002 | Jones |
| 6,398,847 B1 | 6/2002 | Jones |
| 6,406,657 B1 | 6/2002 | Eitzman |
| 6,409,806 B1 | 6/2002 | Jones |
| 6,419,871 B1 | 7/2002 | Ogale |
| 6,432,175 B1 | 8/2002 | Jones |
| 6,454,986 B1 | 9/2002 | Eitzman |
| 6,484,722 B2 | 11/2002 | Bostock |
| RE37,974 E | 2/2003 | Bowers |
| 6,562,112 B2 | 5/2003 | Jones |
| 6,575,165 B1 | 6/2003 | Cook |
| D480,476 S | 10/2003 | Martinson |
| 6,660,210 B2 | 12/2003 | Jones |
| 6,666,209 B2 | 12/2003 | Bennett |
| 6,673,447 B2 | 1/2004 | Wei |
| 6,701,925 B1 | 3/2004 | Resnick |
| 6,743,464 B1 | 6/2004 | Insley |
| 6,752,889 B2 | 6/2004 | Insley |
| 6,776,951 B2 | 8/2004 | Rousseau |
| 6,780,893 B2 | 8/2004 | Sugaya |
| 6,783,574 B1 | 8/2004 | Angadjivand |
| 6,802,315 B2 * | 10/2004 | Gahan et al. ............. 128/206.12 |
| 6,808,548 B2 * | 10/2004 | Wilkins et al. .................. 55/528 |
| 6,808,551 B2 | 10/2004 | Jones |
| 6,824,718 B2 | 11/2004 | Eitzman |
| 6,827,764 B2 * | 12/2004 | Springett et al. .................. 96/66 |
| 6,843,248 B2 | 1/2005 | Japuntich |
| 6,854,463 B2 | 2/2005 | Japuntich |
| 6,872,645 B2 | 3/2005 | Duan |
| 6,953,544 B2 * | 10/2005 | Jones et al. .................. 264/423 |
| 6,969,484 B2 | 11/2005 | Horiguchi |
| 7,013,895 B2 | 3/2006 | Martin |
| 7,015,254 B2 | 3/2006 | Holcomb |
| 7,026,014 B2 | 4/2006 | Luzinov |
| 7,028,689 B2 | 4/2006 | Martin |
| 7,117,868 B1 | 10/2006 | Japuntich |
| 7,132,496 B2 | 11/2006 | Kerres |
| 7,188,622 B2 | 3/2007 | Martin |
| 7,244,291 B2 | 7/2007 | Spartz |
| 7,244,292 B2 | 7/2007 | Kirk |
| 7,311,104 B2 | 12/2007 | Japuntich |
| 7,390,351 B2 | 6/2008 | Leir |
| 7,441,666 B2 | 10/2008 | Kim |
| 7,462,283 B2 | 12/2008 | Kelly |
| 7,553,440 B2 * | 6/2009 | Leonard .................. 264/413 |
| 7,765,698 B2 | 8/2010 | Sebastian |
| 2002/0174869 A1 | 11/2002 | Gahan |
| 2003/0134515 A1 | 7/2003 | David |
| 2004/0067427 A1 | 4/2004 | Tong |
| 2005/0176325 A1 | 8/2005 | Tokuda |
| 2006/0093820 A1 | 5/2006 | Margarit-Puri |
| 2006/0096486 A1 | 5/2006 | Roller |
| 2006/0243139 A1 * | 11/2006 | Kirk et al. .................. 96/69 |
| 2006/0254419 A1 | 11/2006 | Leonard |
| 2007/0134337 A1 | 6/2007 | Villanueva |
| 2007/0141130 A1 | 6/2007 | Villanueva |
| 2007/0142262 A1 | 6/2007 | Sayre |
| 2007/0180997 A1 | 8/2007 | Leir |
| 2008/0207822 A1 | 8/2008 | Yeager |
| 2008/0249269 A1 | 10/2008 | Chin |
| 2011/0041471 A1 | 2/2011 | Sebastian |
| 2011/0137082 A1 | 6/2011 | Li |

FOREIGN PATENT DOCUMENTS

| | | |
|---|---|---|
| JP | 55-053410 | 4/1980 |
| JP | 06-218211 | 8/1994 |
| JP | 11-319441 | 11/1999 |
| JP | 2002-115177 | 4/2002 |
| JP | 2002-115178 | 4/2002 |
| JP | 2002-161467 | 6/2002 |
| JP | 2002-161471 | 6/2002 |
| JP | 2002-173866 | 6/2002 |
| JP | 2002-212439 | 7/2002 |
| JP | 2002-249978 | 9/2002 |
| JP | 2002-339232 | 11/2002 |
| JP | 2003-013359 | 1/2003 |
| JP | 2003-220310 | 8/2003 |
| JP | 2004-060110 | 2/2004 |
| JP | 2004-066026 | 3/2004 |
| JP | 2004-066027 | 3/2004 |
| JP | 2004-195357 | 7/2004 |
| JP | 2005-131484 | 5/2005 |
| JP | 2005-131485 | 5/2005 |
| JP | 2006-037295 | 2/2006 |
| JP | 3780916 | 5/2006 |
| JP | 2008-081894 | 4/2008 |
| JP | 2009-079092 | 4/2009 |
| RU | 2198718 | 2/2003 |
| WO | WO 95-05501 | 2/1995 |
| WO | WO 97-07272 | 2/1997 |
| WO | WO 99-16532 | 4/1999 |
| WO | WO 99-16533 | 4/1999 |
| WO | WO 00-13765 | 3/2000 |
| WO | WO 01-07144 | 2/2001 |
| WO | WO 01-23351 | 4/2001 |
| WO | WO 01-27371 | 4/2001 |
| WO | WO 01-27381 | 4/2001 |
| WO | WO 03-023796 | 3/2003 |
| WO | WO 2006-096486 | 9/2006 |
| WO | WO 2008-016782 | 2/2008 |

OTHER PUBLICATIONS

Chudleigh, Charging of Polymer Foils Using Liquid Contacts, Appl. Phys. Lett., vol. 21, No. 11, pp. 547-548, (Dec. 1, 1972).

Chudleigh, Mechanism of Charge Transfer to a Polymer Surface by a Conducting Liquid Contact, Journal of Applied Physics, vol. 47, No. 10, pp. 4475-4483, (Oct. 1976).

Davies, "The Separation of Airborne Dust and Particles", Institute of Mechanical Engineers, London, Proceedings 1B, pp. 185-213, (1952).

Dean, Physicochemical Relationships, Lange's Handbook of Chemistry, Section 9, 15th Edition, McGraw-Hill, New York, pp. 9.1-9.8, (1999).

(56) References Cited

OTHER PUBLICATIONS

Delgado, Measurement and Interpretation of Electrokinetic Phenomena (IUPAC Technical Report), Pure and Applied Chemistry, vol. 77, No. 10, pp. 1753-1805, (2005).
Easton, The MIDI! Basis Set for Quantum Mechanaical Calculations of Molecular Geometries and Partial Charges, Theoretica Chimica Acta, vol. 93, pp. 281-301, (1996).
Fairbrother, Studies in Electro-Endosmosis, Part I., vol. 125, J. Chem. Soc., pp. 2319-2330, (1924).
Foresman, Exploring Chemistry With Electronic Structure Methods, 2nd Ed., 7 pages, (1996).
Gal, Thermochemical Aspects of Proton Transfer in the Gas Phase, Journal of Mass Spectrometry, vol. 36, pp. 699-716, (2001).
Harfst, Back to Basics Measuring Ph in High-Purity Water, Ultrapure Water, pp. 75-76, (Oct. 1994).
Hehre, Ab Initio Molecular Orbital Theory, Wiley, New York, 10 pages, (1986).
Kohn, Nobel Lecture: Electronic Structure of Matter—Wave Functions and Density Functionals, Reviews of Modern Physics, vol. 71, No. 5, pp. 1253-1266, (Oct. 1999).
Kohn, Self-Consistent Equations Including Exchange and Correlation Effects, Physical Review, vol. 140, No. 4A, p. A1133-A1138, (Nov. 15, 1965).
Kudin, Why Are Water-Hydrophobic Interfaces Charged?, Journal of American Chemical Society, pp. A-E, (2007).
Lias, Gas Phase Ion Thermochemistry, NIST Chemistry WebBook, NIST Standard Reference Database No. 69, National Institute of Standards and Technology, Gaithersburg, MD, (http://webbook.nist.gov), pp. 1-38, (Jun. 2005).
McCarty, Electrostatic Charging Due to Separation of Ions at Interfaces: Contact Electrification of Ionic Electrets, Angewandte Chemie Int. Ed., vol. 47, pp. 2-22, (2008).
McCarty, Ionic Electrets: Electrostatic Charging of Surfaces by Transferring Mobile Ions Upon Contact, Journal American Chemical Society, vol. 129, pp. 4075-4088, (2007).
Shishkin, Structural Non-Rigidity of Six-Membered Aromatic Rings, Journal of Molecular Structure, vol. 616, pp. 159-166, (2002).
Stephens, Ab Initio Calculation of Vibrational Absorption and Circular Dichroism Spectra Using Density Functional Force Fields, Journal of Phys. Chemistry, vol. 98, No. 45, pp. 11623-11627 (Nov. 10, 1994).
Vargas, "An Overview of Raw Materials, Processes, Products, Markets, and Emerging End Uses", Spunlace Technology Today, Miller Freeman Publications, Inc., 1989, pp. 9-12, 132-133, 142-146.
Wente, "Manufacture of Superfine Organic Fibers", Report No. 4364 of the Naval Research Laboratories, 22 pages, (May 25, 1954).
Wente, "Manufacture of Superfine Organic Fibers", Naval Research Laboratory Report 111437, pp. ii-15, (Apr. 15, 1954).
Wente, "Superfine Thermoplastic Fibers", Industrial Engineering Chemistry, vol. 48, pp. 1342-1346, (1956).
Zhao, Design of Density Functionals That are Broadly Accurate for Thermochemistry, Thermochemical Kinetics, and Nonbounded Interactioins, Journal Phys. Chem. A, vol. 109, No. 25, pp. 5656-5667, (2005).
Search Report for PCT/US2008/084686, 3 pages, Apr. 15, 2009.
Search Report for PCT/US2009/040426, 4 pages, Aug. 12, 2009.
Search Report for PCT/US2009/042652, 3 pages, Dec. 28, 2009.
Search Report for PCT/US2009/042689, 3 pages, Dec. 28, 2009.

* cited by examiner

ELECTRET WEBS WITH CHARGE-ENHANCING ADDITIVES

CROSS REFERENCE TO RELATED APPLICATIONS

This application is a national stage filing under 35 U.S.C. 371 of PCT/US2009/042652, filed May 4, 2009, which claims priority to U.S. Patent Application No. 61/058,041, filed Jun. 2, 2008, the disclosure of which is incorporated by reference in its/their entirety herein.

FIELD OF THE DISCLOSURE

This disclosure relates to electret webs, including non-woven fibrous webs such as non-woven thermoplastic microfiber webs, containing charge-enhancing additives and uses thereof.

BACKGROUND

An electret is a dielectric material exhibiting a quasi-permanent electrical charge. Electrets are useful in a variety of devices including, e.g. cling films, air filters, filtering facepieces, and respirators, and as electrostatic elements in electro-acoustic devices such as microphones, headphones, and electrostatic recorders.

The performance of microfibrous webs used for aerosol filtration can be improved by imparting an electrical charge to the fibers, forming an electret material. In particular, electrets are effective in enhancing particle capture in aerosol filters. A number of methods are known for forming electret materials in microfibrous webs. Such methods include, for example, bombarding melt-blown fibers as they issue from the die orifices, as the fibers are formed, with electrically charged particles such as electrons or ions. Other methods include, for example, charging the fibers after the web is formed, by means of a DC corona discharge or imparting a charge to the fiber mat by means of carding and/or needle tacking (tribocharging). Recently, a method in which jets of water or a stream of water droplets impinge on a non-woven web at a pressure sufficient to provide filtration enhancing electret charge has been described (hydrocharging).

SUMMARY

Presented in this disclosure are electret webs containing charge-enhancing additives. These charge-enhancing additives provide electret webs that are easy to charge by a variety of different charging mechanisms such as hydrocharging or a combination of DC corona discharge and hydrocharging.

In some embodiments described herein, the electret web comprises a thermoplastic resin and a charge-enhancing additive comprising an N-substituted amino carbocyclic aromatic material. The electret web may be in the form of a non-woven fibrous web or even a non-woven microfiber web.

In other embodiments described herein, an electret filter medium comprises a non-woven microfiber web comprising a blend of a thermoplastic resin and a charge-enhancing additive comprising an N-substituted amino carbocyclic aromatic material. The electret filter media may comprise a respirator filter, a room ventilation system filter, a vehicle ventilation system filter, an air conditioner filter, a furnace filter, a room air purifier filter, a vacuum cleaner filter, or a computer disk drive filter.

Also disclosed are methods for preparing an electret web comprising providing a thermoplastic material; providing a charge-enhancing additive comprising an N-substituted amino carbocyclic aromatic material; hot melt mixing the thermoplastic material and the charge-enhancing additive to form a thermoplastic blend; and melt blowing the thermoplastic blend to form a microfiber web, and charging the web.

DETAILED DESCRIPTION

Electret webs useful in the present disclosure include a blend of a thermoplastic resin and a charge-enhancing additive. Webs prepared from such blends can show enhanced properties over webs prepared with the thermoplastic resins alone. Useful charge-enhancing additives include N-substituted amino carbocyclic aromatic materials.

The electret webs may be in a variety of forms. For example the web may be a continuous or discontinuous film, or a fibrous web. Fibrous webs are particularly useful for the formation of filtration media. In some embodiments the web is a non-woven microfibrous web. Typically microfibers are 1-100 micrometers in average diameter and the microfibers need not have a circular cross-section.

The terms "a", "an", and "the" are used interchangeably with "at least one" to mean one or more of the elements being described.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl (t-butyl), n-pentyl, n-hexyl, cyclohexyl, n-heptyl, n-octyl, and ethylhexyl.

The term "alkenyl" refers to a monovalent group that is a radical of an alkene, which is a hydrocarbon with at least one carbon-carbon double bond. The alkenyl can be linear, branched, cyclic, or combinations thereof and typically contains 2 to 20 carbon atoms. In some embodiments, the alkenyl contains 2 to 18, 2 to 12, 2 to 10, 4 to 10, 4 to 8, 2 to 8, 2 to 6, or 2 to 4 carbon atoms. Exemplary alkenyl groups include ethenyl, n-propenyl, and n-butenyl.

The term "alkynyl" refers to a monovalent group that is a radical of an alkyne, which is a hydrocarbon with at least one carbon-carbon triple bond. The alkynyl can be linear, branched, cyclic, or combinations thereof and typically contains 2 to 20 carbon atoms. In some embodiments, the alkynyl contains 2 to 18, 2 to 12, 2 to 10, 4 to 10, 4 to 8, 2 to 8, 2 to 6, or 2 to 4 carbon atoms. Exemplary alkynyl groups include ethynyl, n-propynyl, and n-butynyl.

The term "heteroalkyl" refers to an alkyl group which contains heteroatoms. These heteroatoms may be pendant atoms, for example, halogens such as fluorine, chlorine, bromine, or iodine or catenary atoms such as nitrogen, oxygen or sulfur. An example of a heteroalkyl group is a polyoxyalkyl group such as —$CH_2CH_2(OCH_2CH_2)_nOCH_2CH_3$.

The term "substituted alkyl" refers to an alkyl group which contains substituents along the hydrocarbon backbone. These substituents may be alkyl groups, heteroalkyl groups or aryl groups. An example of a substituted alkyl group is a benzyl group.

The term "aryl" refers to an aromatic carbocyclic group that is a radical containing 1 to 5 rings which may be connected or fused. The aryl group may be substituted with alkyl or heteroalkyl groups. Examples of aryl groups include phenyl groups, naphthalene groups and anthracene groups.

The term "N-substituted amino carbocyclic aromatic" refers to a carbocyclic group, i.e. a cyclic group in which the ring structure contains only carbon and hydrogen atoms, that is a radical containing 1 to 5 rings which may be connected or fused, and is substituted with at least one substituted amino group. A substituted amino group is a group of the type —$NR^1R^2$ where the group $R^1$ is hydrogen, alkyl, alkenyl, alkynyl, aryl, heteroalkyl or substituted alkyl, and the group $R^2$ is alkyl, alkenyl, alkynyl, aryl, heteroalkyl or substituted alkyl.

The terms "polymer" and "polymeric material" refer to both materials prepared from one monomer such as a homopolymer or to materials prepared from two or more monomers such as a copolymer, terpolymer, or the like. Likewise, the term "polymerize" refers to the process of making a polymeric material that can be a homopolymer, copolymer, terpolymer, or the like. The terms "copolymer" and "copolymeric material" refer to a polymeric material prepared from at least two monomers.

The terms "room temperature" and "ambient temperature" are used interchangeably to mean temperatures in the range of 20° C. to 25° C.

The term "hot melt processable" as used herein, refers to a composition that can transform, for example, by heat and pressure from a solid to a viscous fluid. The composition should be capable of being hot melt processed without being substantially chemically transformed, degraded or rendered unusable for the intended application.

Unless otherwise indicated, all numbers expressing feature sizes, amounts, and physical properties used in the specification and claims are to be understood as being modified in all instances by the term "about." Accordingly, unless indicated to the contrary, the numbers set forth are approximations that can vary depending upon the desired properties using the teachings disclosed herein.

Thermoplastic resins useful in the present disclosure include any thermoplastic nonconductive polymer capable of retaining a high quantity of trapped electrostatic charge when formed into a web and charged. Typically, such resins have a DC (direct current) resistivity of greater than $10^{14}$ ohm-cm at the temperature of intended use. Polymers capable of acquiring a trapped charge include polyolefins such as polypropylene, polyethylene, and poly-4-methyl-1-pentene; polyvinyl chloride; polystyrene; polycarbonates; polyesters, including polylactides; and perfluorinated polymers and copolymers. Particularly useful materials include polypropylene, poly-4-methyl-1-pentene, blends thereof or copolymers formed from at least one of propylene and 4-methyl-1-pentene.

The charge-enhancing additives are N-substituted amino carbocyclic aromatic materials. Typically the charge-enhancing additives are thermally stable making them suitable for use in hot melt processable compositions. The N-substituted amino carbocyclic aromatic materials may be generally described by Formula I:

$$R^1R^2N—Ar(G)_n \quad \text{Formula I}$$

where Ar is an aryl group, the group $R^1$ is hydrogen, alkyl, alkenyl, alkynyl, aryl, heteroalkyl or substituted alkyl and the group $R^2$ is alkyl, alkenyl, alkynyl, aryl, heteroalkyl or substituted alkyl, n is an integer representing the number of substituent positions on the N-substituted amino aryl group, and G represents the substituents on the N-substituted amino aryl group, each G may independently be hydrogen, alkyl, alkenyl, alkynyl, aryl, heteroalkyl, substituted alkyl, or —$NR^3R^4$ where $R^3$ is hydrogen, alkyl, alkenyl, alkynyl, aryl, heteroalkyl or substituted alkyl and the group $R^4$ is alkyl, alkenyl, alkynyl, aryl, heteroalkyl or substituted alkyl. In some embodiments, Ar of Formula I is a phenyl group and n is 5. In other embodiments, Ar of Formula I is a naphthalene group and n is 7. In other embodiments, Ar of Formula I is an anthracene group and n is 9.

One useful class of N-substituted amino carbocyclic aromatic materials are those described by Formula II where $Z^1$ and $Z^2$ are independently hydrogen, alkyl, alkenyl, alkynyl, aryl, heteroalkyl or —$NR^3R^4$ where $R^3$ is hydrogen, alkyl, alkenyl, alkynyl, aryl, heteroalkyl or substituted alkyl and the group $R^4$ is alkyl, alkenyl, alkynyl, aryl, heteroalkyl or substituted alkyl. The group $R^1$ is hydrogen, alkyl, alkenyl, alkynyl, aryl, heteroalkyl or substituted alkyl and the group $R^2$ is alkyl, alkenyl, alkynyl, aryl, heteroalkyl or substituted alkyl. The groups $Z^1$ and $Z^2$ may be located anywhere on the carbocyclic aromatic ring but typically are located in the 3,5 positions relative to the substituted amino group.

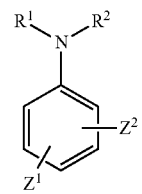

Formula II

One class of suitable charge-enhancing additive included in the materials described by Formula II, includes, for example, ones in which the groups $Z^1$ and $Z^2$ are —$NR^3R^4$ groups located at the 3 and 5 positions of the aromatic ring, where $R^3$ is hydrogen, alkyl, alkenyl, alkynyl, aryl, heteroalkyl or substituted alkyl and the group $R^4$ is alkyl, alkenyl, alkynyl, aryl, heteroalkyl or substituted alkyl. In some instances, the substitution on the aromatic ring is symmetrical, meaning that each of the groups —$NR^1R^2$ and $Z^1$ and $Z^2$ (if present) are the same. In some embodiments, $R^1$ is a hydrogen and $R^2$ is an aryl group. Typically $R^2$ is a substituted aryl group, where the substituent is an alkyl group with 1-25 carbon atoms. In some embodiments, $R^2$ is a phenyl group substituted with an alkyl group with 1-4 carbon atoms. In other embodiments, $R^2$ is a phenyl group substituted with an alkyl group with 5-25 carbon atoms, or 10-25 carbon atoms or even 12-25 carbon atoms. In some of these embodiments, $Z^1$ and $Z^2$ are —$NR^3R^4$ groups where $R^3$ is the same as $R^1$ and $R^4$ is the same as $R^2$. Examples of two such charge-enhancing additives are shown as Formula III and Formula IV below:

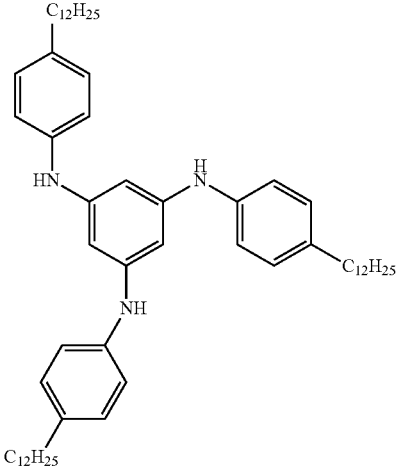

Formula III

-continued

Formula IV

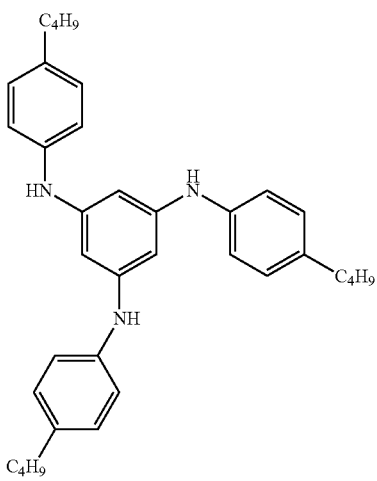

Another suitable class of charge-enhancing additive included in the materials described by Formula II, includes, for example, ones in which the group $Z^1$ is a hydrogen and the group $Z^2$ is $-NR^3R^4$, where $R^1$ and $R^3$ are hydrogens and $R^2$ and $R^4$ are aryl groups. Typically $R^2$ and $R^4$ are substituted aryl groups, where the substituents are alkyl groups with 1-25 carbon atoms. In some embodiments, $R^2$ and $R^4$ are phenyl groups substituted with alkyl groups with 1-4 carbon atoms. In other embodiments, $R^2$ and $R^4$ are phenyl groups substituted with alkyl groups with 5-25 carbon atoms, or 10-25 carbon atoms or even 12-25 carbon atoms. An example of such a charge-enhancing additive is shown as Formula V below:

Formula V

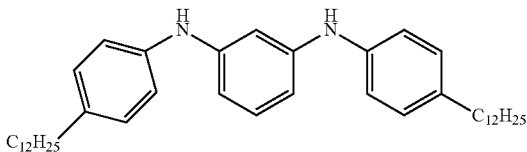

Another useful class of the N-substituted amino carbocyclic aromatic materials described by Formula I, are those in which Ar is a naphthalene ring, n is 7, each G is hydrogen, $R^1$ is a hydrogen and $R^2$ is an aryl group. Typically $R^2$ is a substituted aryl group, where the substituent is an alkyl group with 1-25 carbon atoms. In some embodiments, $R^2$ is a phenyl group substituted with an alkyl group with 5-25 carbon atoms, or 10-25 carbon atoms or even 12-25 carbon atoms. An example of such a charge-enhancing additive is shown as Formula VI below:

Formula VI

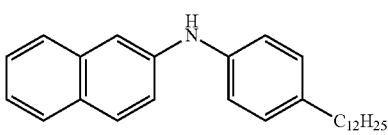

Typically the charge-enhancing additive is present in a thermoplastic resin and charge-enhancing additive blend in amounts in the range of 0.1 to 5% by weight based upon the total weight of the blend. In some embodiments, the charge-enhancing additive is present in an amount ranging from 0.1 to 3% by weight or 0.25 to 2% by weight.

The blend of the thermoplastic resin and the charge-enhancing additive can be prepared by well-known methods. Typically, the blend is processed using melt extrusion techniques, so the blend may be preblended to form pellets in a batch process, or the thermoplastic resin and the charge-enhancing additive may be mixed in the extruder in a continuous process. Where a continuous process is used, the thermoplastic resin and the charge-enhancing additive may be pre-mixed as solids or added separately to the extruder and allowed to mix in the molten state.

Examples of melt mixers that may be used to form preblended pellets include those that provide dispersive mixing, distributive mixing, or a combination of dispersive and distributive mixing. Examples of batch methods include those using a BRABENDER (e.g. a BRABENDER PREP CENTER, commercially available from C.W. Brabender Instruments, Inc.; South Hackensack, N.J.) or BANBURY internal mixing and roll milling equipment (e.g. equipment available from Farrel Co.; Ansonia, Conn.). After batch mixing, the mixture created may be immediately quenched and stored below the melting temperature of the mixture for later processing.

Examples of continuous methods include single screw extruding, twin screw extruding, disk extruding, reciprocating single screw extruding, and pin barrel single screw extruding. The continuous methods can include utilizing both distributive elements, such as cavity transfer mixers (e.g. CTM, commercially available from RAPRA Technology, Ltd.; Shrewsbury, England) and pin mixing elements, static mixing elements or dispersive mixing elements (commercially available from e.g., MADDOCK mixing elements or SAXTON mixing elements).

Examples of extruders that may be used to extrude preblended pellets prepared by a batch process include the same types of equipment described above for continuous processing. Useful extrusion conditions are generally those which are suitable for extruding the resin without the additive.

The extruded blend of thermoplastic resin and charge-enhancing additive may be cast or coated into films or sheets or may be melt-blown into non-woven fibrous webs using known techniques. Melt-blown, non-woven microfibrous webs are particularly useful as filtration media.

Melt-blown, non-woven microfibrous electret filters are especially useful as an air filter element of a respirator, such as a filtering facepiece, or for such purposes as home and industrial air-conditioners, air cleaners, vacuum cleaners, medical air line filters, and air conditioning systems for vehicles and common equipment, such as computers, computer disk drives and electronic equipment. In respirator uses, the electret filters may be in the form of molded or folded half-face respirators, replaceable cartridges or canisters, or prefilters.

Melt-blown microfibers useful in the present disclosure can be prepared as described in Van A. Wente, "Superfine Thermoplastic Fibers," Industrial Engineering Chemistry, vol. 48, pp. 1342-1346 and in Report No. 4364 of the Naval Research Laboratories, published May 25, 1954, entitled "Manufacture of Super Fine Organic Fibers" by Van A. Wente et al.

Useful melt-blown microfibers for fibrous electret filters typically have an effective fiber diameter of from about 3 to 30 micrometers, in some embodiments from about 7 to 15 micrometers, as calculated according to the method set forth in Davies, C. N., "The Separation of Airborne Dust and Particles," Institution of Mechanical Engineers, London, Proceedings 1B, 1952.

Staple fibers may also be present in the web. The presence of staple fibers generally provides a more lofty, less dense web than a web of only blown microfibers. Preferably, no more than about 90 weight percent staple fibers are present, more preferably no more than about 70 weight percent. Examples of webs containing staple fiber are disclosed in U.S. Pat. No. 4,118,531 (Hauser).

Sorbent particulate material such as activated carbon or alumina may also be included in the web. Such particles may be present in amounts up to about 80 volume percent of the contents of the web. Examples of particle-loaded webs are described, for example, in U.S. Pat. No. 3,971,373 (Braun), U.S. Pat. No. 4,100,324 (Anderson) and U.S. Pat. No. 4,429,001 (Kolpin et al.).

Various optional additives can be blended with the thermoplastic composition including, for example, pigments, UV stabilizers, antioxidants and combinations thereof. Additionally, other types of charge-enhancing additives may added if desired, as long as they do not interfere with the function of the N-substituted amino carbocyclic aromatic material.

The electret filter media prepared according to the present disclosure generally have a basis weight in the range of about 10 to 500 g/m$^2$, and in some embodiments, about 10 to 100 g/m$^2$. In making melt-blown microfiber webs, the basis weight can be controlled, for example, by changing either the collector speed or the die throughput. The thickness of the filter medium is typically about 0.25 to 20 millimeters, and in some embodiments, about 0.5 to 2 millimeters. Multiple layers of fibrous electret webs are commonly used in filter elements. The solidity of the fibrous electret web typically is about 1% to 25%, more typically about 3% to 10%. Solidity is a unitless parameter that defines the solids fraction of the web. Generally the methods of this disclosure provide electret webs with generally uniform charge distribution throughout the web without regard to basis weight, thickness, or solidity of the medium. The electret filter medium and the resin from which it is produced should not be subjected to any unnecessary treatment which might increase its electrical conductivity, e.g., exposure to ionizing radiation, gamma rays, ultraviolet irradiation, pyrolysis, oxidation, etc.

The electret web may be charged as it is formed or the web may be charged after the web is formed. In electret filter media, the medium is generally charged after the web is formed. In general, any standard charging method known in the art may be used. For example, charging may be carried out in a variety of ways, including hydrocharging. A combination of DC corona discharge and hydrocharging may also be used.

Examples of suitable DC corona discharge processes are described in U.S. Pat. Re. No. 30,782 (van Turnhout), U.S. Pat. Re. No. 31,285 (van Turnhout), U.S. Pat. Re. No. 32,171 (van Turnhout), U.S. Pat. No. 4,215,682 (Davis et al.), U.S. Pat. No. 4,375,718 (Wadsworth et al.), U.S. Pat. No. 5,401,446 (Wadsworth et al.), U.S. Pat. No. 4,588,537 (Klaase et al.), and U.S. Pat. No. 4,592,815 (Nakao).

Hydrocharging of the web is carried out by impinging jets of water or a stream of water droplets onto the web at a pressure sufficient to provide the web with filtration enhancing electret charge. The pressure necessary to achieve optimum results varies depending on the type of sprayer used, the type of polymer from which the web is formed, the type and concentration of additives to the polymer, the thickness and density of the web and whether pre-treatment, such as DC corona surface treatment, was carried out prior to hydrocharging. Generally, pressures in the range of about 10 to 500 psi (69 to 3450 kPa) are suitable.

The jets of water or stream of water droplets can be provided by any suitable spray means. An apparatus useful for hydraulically entangling fibers is generally useful in the method of the present disclosure, although operation is carried out at lower pressures in hydrocharging than generally used in hydroentangling. Hydrocharging is understood to include the method described in U.S. Pat. No. 5,496,507 (Angadjivand) and other various derivative methods for imparting an electret charge using the fluid wetting and dewetting process as described in, for example, Japanese Patent Application Number JP 2002161467 (Horiguchi), Japanese Patent Application Number JP 2002173866 (Takeda), Japanese Patent Application Number JP 2002115177 (Takeda), Japanese Patent Application Number JP 2002339232 (Takeda), Japanese Patent Application Number JP 2002161471 (Takeda), Japanese Pat. No. 3,780,916 (Takeda), Japanese Patent Application Number JP 2002115178 (Takeda), Japanese Patent Application Number JP 2003013359 (Horiguchi), U.S. Pat. No. 6,969,484 (Horiguchi), U.S. Pat. No. 6,454,986 (Eitzman), Japanese Patent Application Number JP 2004060110 (Masumori), Japanese Patent Application Number JP 2005131485 (Kodama), and Japanese Patent Application Number JP 2005131484 (Kodama).

To model filtration performance, a variety of filtration testing protocols have been developed. These tests include measurement of the aerosol penetration of the filter web using a standard challenge aerosol such as dioctylphthalate (DOP), which is usually presented as percent of aerosol penetration through the filter web (% Pen) and measurement of the pressure drop across the filter web ($\Delta P$). From these two measurements, a quantity known as the quality factor (QF) may be calculated by the following equation:

$$QF = -\ln(\%Pen/100)/\Delta P,$$

where ln stands for the natural logarithm. A higher QF value indicates better filtration performance, and decreased QF values effectively correlate with decreased filtration performance. Details for measuring these values are presented in the Examples section. Typically, the filtration media of this disclosure have measured QF values of 0.3 or greater at a face velocity of 6.9 centimeters per second.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wis. unless otherwise noted.

Table of Abbreviations

| Abbreviation or Trade Designation | Description |
|---|---|
| Charge-Enhancing Additive-1 | 1,3,5-tris(4-n-dodecylanilino)benzene, the synthesis is shown in the Syntheses Examples section as SE-1. |

-continued

Table of Abbreviations

| Abbreviation or Trade Designation | Description |
|---|---|
| Charge-Enhancing Additive-2 | 1,3,5-tris(4-n-butylanilino)benzene, the synthesis is shown in the Syntheses Examples section as SE-2. |
| Charge-Enhancing Additive-3 | 1,3-bis(4-n-dodecylanilino)benzene, the synthesis is shown in the Syntheses Examples section as SE-3. |
| Charge-Enhancing Additive-4 | β-(4-n-dodecylanilino)naphthalene, the synthesis is shown in the Syntheses Examples section as SE-4. |
| PP-1 | Polypropylene resin grade 1, ESCORENE PP 3746G, commercially available from Exxon-Mobil Corporation, Irving, TX. |
| PP-2 | Polypropylene resin grade 2, TOTAL PP3960, commercially available from Total Petrochemicals USA Inc., Houston, TX. |

Test Methods
Filtration Testing

The samples were tested for % DOP aerosol penetration (% Pen) and pressure drop (ΔP), and the quality factor (QF) was calculated. The filtration performance (% Pen and QF) of the nonwoven microfiber webs were evaluated using an Automated Filter Tester AFT Model 8127 (available from TSI, Inc., St. Paul, Minn.) using dioctylphthalate (DOP) as the challenge aerosol and a MKS pressure transducer that measured pressure drop (ΔP (mm of $H_2O$)) across the filter. The DOP aerosol is nominally a monodisperse 0.3 micrometer mass median diameter having an upstream concentration of 100 mg/m$^3$. The aerosol was forced through a sample of filter medium at a calibrated flow rate of 42.5 liters/minute (face velocity of 6.9 cm/s) with the aerosol ionizer turned off. The total testing time was 23 seconds (rise time of 15 seconds, sample time of 4 seconds, and purge time of 4 seconds). The concentration of DOP aerosol was measured by light scattering both upstream and downstream of the filter medium using calibrated photometers. The DOP % Pen is defined as: % Pen=100×(DOP concentration downstream/DOP concentration upstream). For each material, 6 separate measurements were made at different locations on the BMF web and the results were averaged.

The % Pen and ΔP were used to calculate a QF by the following formula:

$$QF = -\ln(\%Pen/100)/\Delta P,$$

where ln stands for the natural logarithm. A higher QF value indicates better filtration performance and decreased QF values effectively correlate with decreased filtration performance.

Elemental Analysis:

Elemental analysis samples were analyzed for weight percent Carbon, Hydrogen and Nitrogen by combustion using a LECO 932 CHNS elemental analyzer (LECO Corp, St. Joseph, Mich.). The samples were run in triplicate. A sulfamethazine standard was also run to check calibration. The results of each individual run are shown along with the calculated averages and standard deviations.

Thermal Stability Analysis:

The thermal stability of charge-enhancing additive samples was measured with a Thermogravimetric Analyzer (TGA) Model 2950 available from TA Instruments, New Castle, Del. Approximately 5-10 milligrams of material was placed in the TGA and heated from room temperature to 500° C. at a rate of 10° C./min under an air environment while the weight loss was measured. Results are presented as the temperature at which 2% weight loss occurred.

Synthesis Examples

Synthesis Example SE-1

Preparation of Charge-Enhancing Additive-1

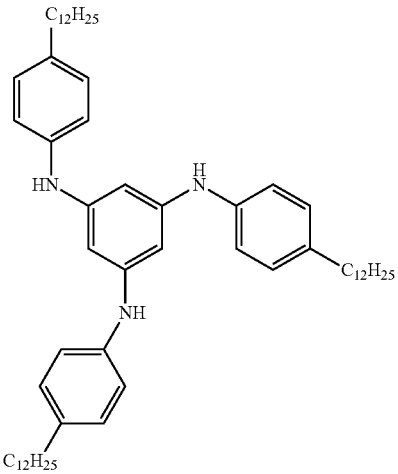

Charge-Enhancing Additive-1

In a three-necked round-bottomed flask fitted with magnetic stirring bar was placed phloroglucinol dehydrate (6.63 grams, 97%), 4-dodecylaniline (36.40 grams, 97%) and iodine (0.13 gram, 99%) and toluene (30 milliliters). After the flask was equipped with Dean-Stark trap and condenser, it was then heated at 130° C. for 12 hours under constant stirring. After the temperature of the reaction mixture was allowed to cool to about 60° C. (the mixture was a viscous liquid), it was slowly poured into 200 milliliters of ethanol to cause precipitation. The precipitate was obtained as a pink solid through filtration. Recrystallization twice from ethanol (150 milliliters for each) afforded Charge-Enhancing Additive-1 (31.0 grams, 87.8% yield) as a light pink powder after being dried at 50° C. under vacuum (27 mmHg) overnight. Elemental Analysis and a $^1$H NMR spectrum were obtained with the following results: Elemental Analysis: (Calculated: C, 84.15; H, 10.95; N, 4.91. Found: C, 84.28; H, 10.86; N, 4.85); $^1$H NMR (400 MHz CDCl$_3$) δ 7.07 (d, J=8.32 Hz, 6H), 7.02 (d, J=8.32 Hz, 6H), 6.21 (s, 3H), 5.51 (s, 3H), 2.53 (t, J=7.6 Hz, 6H), 1.65-1.50 (m, 6H), 1.28-1.15 (m, 54H), 0.88 (t, J=7.6 Hz, 9H). Thermal stability was measured using the Thermal Stability Test Method described above. The results are shown in Table 1 below.

Synthesis Example SE-2

Preparation of Charge-Enhancing Additive-2

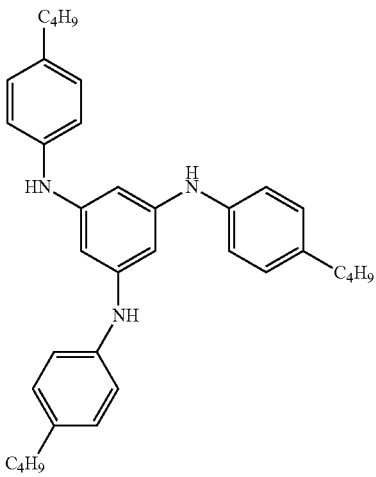

Charge-Enhancing Additive-2

In a three-necked round-bottomed flask fitted with magnetic stirring bar was placed phloroglucinol dehydrate (20.00 grams, 97%), 4-butylaniline (73.63 grams, 97%) and iodine (0.40 gram, 99%). After the flask was equipped with Dean-Stark trap and condenser, it was then heated at 150° C. for 20 hours under constant stirring. After the temperature of the reaction mixture was allowed to cool to about 60° C. (the mixture was a viscous liquid), it was slowly poured into 200 milliliters of ethanol to cause precipitation. The precipitate was obtained as a pink solid through filtration. Recrystallization from ethanol afforded Charge-Enhancing Additive-2 (42.0 grams, 67.5% yield) as a light pink powder after being dried at 50° C. under vacuum (27 mmHg) overnight. Elemental Analysis and a $^1$H NMR spectrum were obtained with the following results: Elemental Analysis: (Calculated: C, 83.19; H, 8.73; N, 8.08. Found: C, 83.08; H, 8.79; N, 8.00); $^1$H NMR (400 MHz CDCl$_3$) δ 7.08 (d, J=8.24 Hz, 6H), 7.02 (d, J=8.24 Hz, 6H), 6.21 (s, 3H), 5.51 (s, 3H), 2.55 (t, J=7.6 Hz, 6H), 1.65-1.53 (m, 6H), 1.40-1.30 (m, 6H), 0.93 (t, J=7.60 Hz, 9H). Thermal stability was measured using the Thermal Stability Test Method described above. The results are shown in Table 1 below.

Synthesis Example SE-3

Preparation of Charge-Enhancing Additive-3

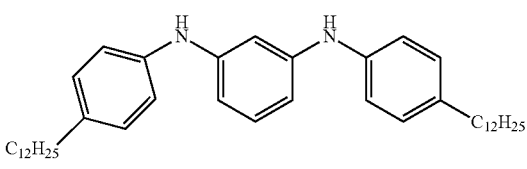

Charge-Enhancing Additive-3

In a three-necked round-bottomed flask fitted with magnetic stirring bar was placed resorcinol (5.83 grams, 98%), 4-dodecylaniline (30.00 grams, 97%) and iodine (0.15 gram, 99%). After the flask was equipped with a condenser and air was removed by flushing with N$_2$, the flask was placed in an oil bath. The oil was heated and the magnetic stirrer was turned on when the mixture became liquid. The mixture was heated at 190° C. for 24 hours under constant stirring. The reaction mixture solidified during cooling to room temperature, and ethanol (60 milliliters) was added to the flask. The flask was re-heated to boil the mixture for 5 minutes. The resulted solution was placed in refrigerator overnight to give a dark red solid which was collected by filtration. Removal of discoloration was carried out by dissolving in acetone (100 milliliters) and adding activated carbon (2.0 grams). The thus treated solid was further purified by chromatography by passing it through silica gel (70-150 mesh, commercially available from Alfa Aesar) using methylene chloride as the eluting solvent. The pure product was obtained as light pale powder (6.50 grams, 20.6% yield) after removing the solvent using a rotary evaporator and drying the solid at 50° C. under vacuum (27 mmHg) overnight. Elemental Analysis and a $^1$H NMR spectrum were obtained with the following results: Elemental Analysis: (Calculated: C, 84.50; H, 10.81; N, 4.69. Found: C, 84.64; H, 10.52, N, 4.69); $^1$H NMR (400 MHz CDCl$_3$) δ 7.10-7.05 (m, 5H), 7.02 (d, J=8.36 Hz, 4H), 6.67 (s, 1H), 6.55 (d, J=8.0 Hz, 2H), 5.58 (bs, 2H), 2.54 (t, J=7.84 Hz, 4H), 1.65-1.50 (m, 4H), 1.40-1.20 (m, 36H), 0.93 (t, J=7.84 Hz, 6H). Thermal stability was measured using the Thermal Stability Test Method described above. The results are shown in Table 1 below.

Synthesis Example SE-4

Preparation of Charge-Enhancing Additive-4

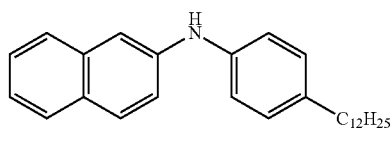

Charge-Enhancing Additive-4

In a three-necked round-bottomed flask fitted with magnetic stirring bar was placed β-Naphthol (20.60 grams), 4-dodecylaniline (35.00 grams, 97%) and iodine (0.50 gram, 99%). After the flask was equipped with a condenser and air was removed by flushing with N$_2$, the flask was placed in an oil bath. The oil was heated and the magnetic stirrer was turned on when the mixture became liquid. The mixture was heated at 190° C. for 48 hours under constant stirring. The reaction mixture solidified during cooling to room temperature, and ethanol (100 milliliters) was added to the flask. The flask was heated to boil the mixture for 5 minutes. The resulted solution was placed in refrigerator overnight to give a dark grey solid which was collected by filtration. Recrystallization from ethanol (80 milliliters) yielded Charge-Enhancing Additive-4 as a grey-greenish powder (19.6 grams, 39% yield) after being dried at 50° C. under vacuum (27 mmHg) overnight. Elemental Analysis and a $^1$H NMR spectrum were obtained with the following results: Elemental Analysis: (Calculated: C, 86.76; H, 9.62; N, 3.61. Found: C, 86.32; H, 9.45; N, 3.59); $^1$H NMR (400 MHz CDCl$_3$) δ 7.72 (d, J=8.88 Hz, 2H), 7.62 (d, J=8.24 Hz, 1H), 7.40-7.35 (m, 2H), 7.30-7.24 (m, 1H), 7.20-7.08 (m, 5H), 5.77 (s, 1H), 2.58 (t, J=7.04 Hz, 2H), 1.70-1.50 (m, 2H), 1.35-1.20 (m, 18H), 0.93 (t, J=7.04 Hz, 3H). Thermal stability was measured using the Thermal Stability Test Method described above. The results are shown in Table 1 below.

TABLE 1

| Charge-Enhancing Additive | Temperature at 2% weight loss (° C.) |
|---|---|
| 1 | 371 |
| 2 | 324 |
| 3 | 222 |
| 4 | 268 |

Examples 1-11 and Comparative Examples C1-C6

For each of the Examples and Comparative Examples, the procedures described below were followed. The data for these Examples are presented in Tables 2 and Table 3.

Step A—Preparation of Microfiber Webs:

For each Example, one of the charge-enhancing additives described above (either Charge-Enhancing Additive 1, 2, 3 or 4) was selected and dry blended with one of the 2 grades of polypropylene at the concentration shown in Table 2, and the blend was extruded as described in Van A. Wente, "Superfine Thermoplastic Fibers," Industrial Engineering Chemistry, vol. 48, pp. 1342-1346 and Naval Research Laboratory Report 111437 (Apr. 15, 1954). The extrusion temperature ranged from about 250° C.-300° C. and the extruder was a BRABENDER conical twin-screw extruder (commercially available from Brabender Instruments, Inc.) operating at a rate of about 2.5 to 3 kg/hr (5-7 lb/hr). The die was 25.4 cm (10 in) wide with 10 holes per centimeter (25 holes per inch). Melt-blown microfiber (BMF) webs were formed having basis weights of 49-97 g/m$^2$, effective fiber diameters of 7.3-14.1 micrometers and a thicknesses of about 0.71-1.55 millimeters.

Similarly, for each Comparative Example, a BMF web was prepared from the same grade of polypropylene as the corresponding Example web, but no charge-enhancing additive was added. Table 2 summarizes the specific web characteristics for each of the examples.

Step B—Electret Preparation:

Each of the BMF webs prepared in Step A above was charged by one of two electret charging methods: hydrocharging, or a combination of corona pre-treatment and hydrocharging. Table 2 summarizes the specific charging method applied to each of the samples.

Charging Method 1—Hydrocharging:

A fine spray of high purity water having a conductivity of less than 5 microS/cm was continuously generated from a nozzle operating at a pressure of 896 kiloPascals (130 psig) and a flow rate of approximately 1.4 liters/minute. The selected BMF webs prepared in Step A were conveyed by a porous belt through the water spray at a speed of approximately 10 centimeters/second while a vacuum simultaneously drew the water through the web from below. Each BMF web was run through the hydrocharger twice (sequentially once on each side) and then allowed to dry completely overnight prior to filter testing.

Charging Method 2—Corona Pre-Treatment and Hydrocharging:

The selected BMF webs prepared in Step A above were pretreated by DC corona discharge. The corona pre-treatment was accomplished by passing the web on a grounded surface under a corona brush source with a corona current of about 0.01 milliamp per centimeter of discharge source length at a rate of about 3 centimeters per second. The corona source was about 3.5 centimeters above the grounded surface on which the web was carried. The corona source was driven by a positive DC voltage. The BMF web was then charged by hydrocharging as described in Charging Method 1.

Filtration Performance:

Each of the charged samples prepared in Step B above was cut into a 1 meter section. Each section was tested for its % DOP aerosol penetration (% Pen) and pressure drop (ΔP), and the quality factor (QF) was calculated as described in the Test Methods given above. These results are reported in Table 3 below as % Pen, ΔP and QF.

TABLE 2

| Example | Charge-Enhancing Additive Example | Charging Method | Resin Grade | Additive Concn. (wt %) | Eff. Fiber Diam. (μm) | Solidity (%) | Basis Weight (g/m$^2$) | Thickness (mm) |
|---|---|---|---|---|---|---|---|---|
| 1 | 2 | 1 | PP1 | 1 | 14.1 | 6.9 | 97 | 1.55 |
| 2 | 2 | 1 | PP1 | 1 | 13.9 | 7.7 | 50 | 0.71 |
| 3 | 1 | 1 | PP1 | 1 | 12.0 | 7.4 | 49 | 0.74 |
| 4 | 1 | 1 | PP1 | 1 | 10.3 | 6.0 | 52 | 0.97 |
| C1 | none | 1 | PP1 | 0 | 7.6 | 5.3 | 55 | 1.16 |
| 5 | 1 | 1 | PP2 | 0.75 | 7.4 | 5.0 | 59 | 1.30 |
| C2 | none | 1 | PP2 | 0 | 7.6 | 5.7 | 59 | 1.13 |
| 6 | 1 | 2 | PP2 | 0.75 | 7.4 | 5.0 | 59 | 1.30 |
| C3 | none | 2 | PP2 | 0 | 7.6 | 5.3 | 59 | 1.30 |
| 7 | 1 | 1 | PP1 | 0.75 | 9.4 | 5.7 | 56 | 1.08 |
| C4 | none | 1 | PP1 | 0 | 7.8 | 5.9 | 53 | 0.99 |
| 8 | 1 | 1 | PP2 | 0.75 | 10.2 | 6.9 | 60 | 0.97 |
| C5 | none | 1 | PP2 | 0 | 7.7 | 6.0 | 60 | 1.11 |
| 9 | 4 | 1 | PP1 | 1 | 8.9 | 6.0 | 52 | 0.97 |
| 10 | 4 | 1 | PP1 | 0.5 | 7.7 | 6.0 | 52 | 0.97 |
| 11 | 3 | 1 | PP1 | 0.5 | 7.5 | 6.2 | 50 | 0.89 |
| C6 | none | 1 | PP1 | 0 | 7.3 | 5.9 | 57 | 1.08 |

TABLE 3

| Example | Charging Method | % Pen | ΔP (mm of H$_2$O) | QF |
|---|---|---|---|---|
| 1 | 1 | 9.39 | 1.2 | 1.99 |
| 2 | 1 | 31.68 | 0.56 | 2.07 |
| 3 | 1 | 13.10 | 0.78 | 2.61 |

TABLE 3-continued

| Example | Charging Method | % Pen | ΔP (mm of H$_2$O) | QF |
|---|---|---|---|---|
| 4 | 1 | 6.17 | 1.06 | 2.64 |
| C1 | 1 | 36.90 | 2.2 | 0.45 |
| 5 | 1 | 0.75 | 2.33 | 2.12 |
| C2 | 1 | 52.82 | 2.07 | 0.31 |
| 6 | 2 | 1.52 | 2.32 | 1.83 |
| C3 | 2 | 21.05 | 2.37 | 0.67 |
| 7 | 1 | 8.94 | 1.25 | 1.94 |
| C4 | 1 | 21.85 | 1.83 | 0.83 |
| 8 | 1 | 3.67 | 1.50 | 2.22 |
| C5 | 1 | 17.10 | 1.88 | 0.94 |
| 9 | 1 | 36.23 | 1.33 | 0.76 |
| 10 | 1 | 33.88 | 1.65 | 0.66 |
| 11 | 1 | 11.14 | 2.03 | 1.08 |
| C6 | 1 | 43.48 | 1.82 | 0.46 |

What is claimed is:

1. An electret web comprising:
   a thermoplastic resin; and
   a charge-enhancing additive comprising an N-substituted amino carbocyclic aromatic material.

2. The electret web of claim 1 wherein the web comprises a non-woven microfiber web.

3. The electret web of claim 1 wherein the N-substituted amino carbocyclic aromatic material comprises the structure (a):

where Ar is an aryl group;
the group $R^1$ is hydrogen, alkyl, alkenyl, alkynyl, aryl, heteroalkyl or substituted alkyl;
the group $R^2$ is alkyl, alkenyl, alkynyl, aryl, heteroalkyl or substituted alkyl; and
each G is independently hydrogen, alkyl, alkenyl, alkynyl, aryl, heteroalkyl, substituted alkyl, or —NR$^3$R$^4$ where each $R^3$ is independently hydrogen, alkyl, alkenyl, alkynyl, aryl, heteroalkyl or substituted alkyl, and each $R^4$ is independently alkyl, alkenyl, alkynyl, aryl, heteroalkyl or substituted alkyl; and
Ar is a phenyl group when n is 5, a naphthalene group when n is 7, or an anthracene group when n is 9.

4. The electret web of claim 3 wherein the N-substituted amino carbocyclic aromatic material comprises the structure (b):

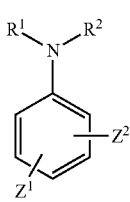

where $Z^1$ and $Z^2$ are independently hydrogen, alkyl, alkenyl, alkynyl, aryl, heteroalkyl or —NR$^3$R$^4$, and each $R^3$ is independently hydrogen, alkyl, alkenyl, alkynyl, aryl, heteroalkyl or substituted alkyl, and each $R^4$ is independently alkyl, alkenyl, alkynyl, aryl, heteroalkyl or substituted alkyl;
$R^1$ is hydrogen, alkyl, alkenyl, alkynyl, aryl, heteroalkyl or substituted alkyl; and
$R^2$ is alkyl, alkenyl, alkynyl, aryl, heteroalkyl or substituted alkyl.

5. The electret web of claim 3 wherein the N-substituted amino carbocyclic aromatic material comprises the structures (c)-(f):

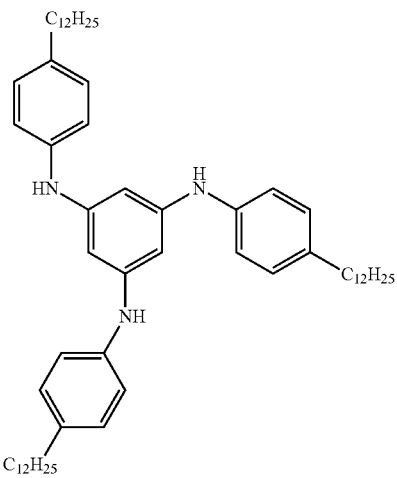

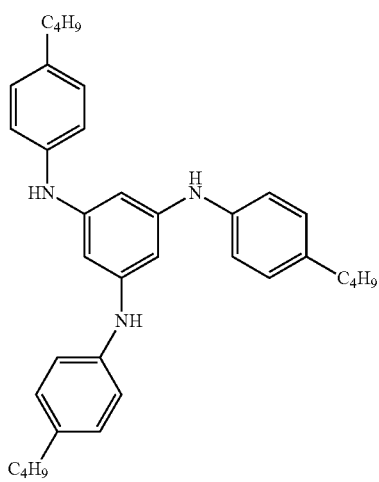

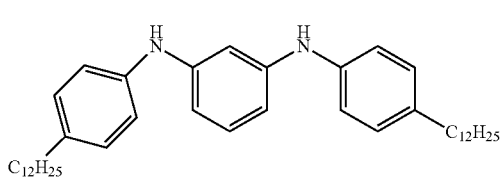

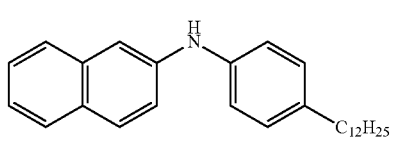

or combinations thereof.

6. The electret web of claim 2 wherein the non-woven microfiber web comprises:

polypropylene; poly(4-methyl-1-pentene); copolymers of propylene and 4-methyl-1-pentene; or mixtures thereof.

7. The electret web of claim 1 wherein the N-substituted amino carbocyclic aromatic material comprises 0.1-5.0% by weight of the web.

8. An electret filter medium comprising:

a non-woven microfiber web comprising a blend of:

a thermoplastic resin; and a charge-enhancing additive comprising an N-substituted amino carbocyclic aromatic material.

9. The electret filter medium of claim 8 wherein the N-substituted amino carbocyclic aromatic material comprises the structure (a):

$$R^1R^2N\text{—}Ar(G) \quad (a)$$

where Ar is an aryl group;

the group $R^1$ is hydrogen, alkyl, alkenyl, alkynyl, aryl, heteroalkyl or substituted alkyl;

the group $R^2$ is alkyl, alkenyl, alkynyl, aryl, heteroalkyl or substituted alkyl; and each G is independently hydrogen, alkyl, alkenyl, alkynyl, aryl, heteroalkyl, substituted alkyl, or —NR$^3$R$^4$ where each R$^3$ is independently hydrogen, alkyl, alkenyl, alkynyl, aryl, heteroalkyl or substituted alkyl, and each R$^4$ is independently alkyl, alkenyl, alkynyl, aryl, heteroalkyl or substituted alkyl; and Ar is a phenyl group when n is 5, a naphthalene group when n is 7, or an anthracene group when n is 9.

10. The electret filter medium of claim 9 wherein the N-substituted amino carbocyclic aromatic material comprises the structure (b):

(b)

[Chemical structure: R$^1$R$^2$N-phenyl with Z$^1$ and Z$^2$ substituents]

where Z$^1$ and Z$^2$ are independently hydrogen, alkyl, alkenyl, alkynyl, aryl, heteroalkyl or —NR$^3$R$^4$, and each R$^3$ is independently hydrogen, alkyl, alkenyl, alkynyl, aryl, heteroalkyl or substituted alkyl, and each R$^4$ is independently alkyl, alkenyl, alkynyl, aryl, heteroalkyl or substituted alkyl;

R$^1$ is hydrogen, alkyl, alkenyl, alkynyl, aryl, heteroalkyl or substituted alkyl; and R$^2$ is alkyl, alkenyl, alkynyl, aryl, heteroalkyl or substituted alkyl.

11. The electret filter medium of claim 9 wherein the N-substituted amino carbocyclic aromatic material comprises the structures (c)-(f):

(c) [Chemical structure with three C$_{12}$H$_{25}$-phenyl-NH groups on central benzene]

(d) [Chemical structure with three C$_4$H$_9$-phenyl-NH groups on central benzene]

(e) [Chemical structure: C$_{12}$H$_{25}$-phenyl-NH-phenyl-NH-phenyl-C$_{12}$H$_{25}$]

(f) [Chemical structure: naphthyl-NH-phenyl-C$_{12}$H$_{25}$]

or combinations thereof.

12. The electret filter medium of claim 8 wherein the non-woven microfiber web comprises:

polypropylene; poly(4-methyl-1-pentene); copolymers of propylene and 4-methyl-1-pentene; or mixtures thereof.

13. The electret filter medium of claim 8 wherein the N-substituted amino carbocyclic aromatic material comprises 0.1-5.0% by weight of the web.

14. The electret filter medium of claim 8 wherein the web contains a charge, wherein the charge is imparted through hydrocharging, or a combination of DC corona treatment and hydrocharging.

15. The electret filter medium of claim 14 wherein the web has sufficient electrostatic charge to exhibit filtration performance as measured by QF of 0.3 or greater at a face velocity of 6.9 centimeters per second.

16. The electret filter medium of claim 8 wherein the filter medium comprises:
a respirator filter, a room ventilation system filter, a vehicle ventilation system filter, an air conditioner filter, a furnace filter, a room air purifier filter, a vacuum cleaner filter, or a computer disk drive filter.

17. A method of preparing an electret web comprising:
providing a thermoplastic material;
providing a charge-enhancing additive comprising an N-substituted amino carbocyclic aromatic material;
hot melt mixing the thermoplastic material and the charge-enhancing additive to yield a thermoplastic blend;
melt blowing the thermoplastic blend to form a microfiber web; and
electrostatically charging the web.

18. The method of claim 17 wherein the N-substituted amino carbocyclic aromatic material is represented by structure (a):

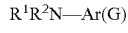  (a)

where Ar is an aryl group;
the group $R^1$ is hydrogen, alkyl, alkenyl, alkynyl, aryl, heteroalkyl or substituted alkyl;
the group $R^2$ is alkyl, alkenyl, alkynyl, aryl, heteroalkyl or substituted alkyl; and
each G is independently hydrogen, alkyl, alkenyl, alkynyl, aryl, heteroalkyl, substituted alkyl, or —$NR^3R^4$ where each $R^3$ is independently hydrogen, alkyl, alkenyl, alkynyl, aryl, heteroalkyl or substituted alkyl, and each $R^4$ is independently alkyl, alkenyl, alkynyl, aryl, heteroalkyl or substituted alkyl; and
Ar is a phenyl group when n is 5, a naphthalene group when n is 7, or an anthracene group when n is 9.

19. The method of claim 17 wherein the thermoplastic material comprises:
polypropylene; poly(4-methyl-1-pentene); copolymers of propylene and 4-methyl-1-pentene; and mixtures thereof.

20. The method of claim 17 wherein the hot melt processable, charge-enhancing additive comprises 0.1-5.0% by weight of the formed microfiber web.

* * * * *

UNITED STATES PATENT AND TRADEMARK OFFICE
CERTIFICATE OF CORRECTION

PATENT NO.        : 8,613,795 B2                                Page 1 of 1
APPLICATION NO.   : 12/995709
DATED             : December 24, 2013
INVENTOR(S)       : Fuming Li et al.

It is certified that error appears in the above-identified patent and that said Letters Patent is hereby corrected as shown below:

In the Specification

Column 1
Line 4, Delete "Mechanaical" and insert -- Mechanical --, therefor.

Column 2
Line 24, Delete "Interactioins" and insert -- Interactions --, therefor.

In the Claims

Column 17
Line 20, In Claim 9, delete "$R^1R^2N\text{—}Ar(G)$" and insert -- $R^1R^2N\text{—}Ar(G)_n$ --, therefor.

Column 19
Line 23, In Claim 18, delete "$R^1R^2N\text{—}Ar(G)$" and insert -- $R^1R^2N\text{—}Ar(G)_n$ --, therefor.

Signed and Sealed this
Third Day of March, 2015

Michelle K. Lee
*Deputy Director of the United States Patent and Trademark Office*